Oct. 21, 1941.   E. ZENTNER   2,259,717
PROCESS OF SOFTENING WATER
Filed July 29, 1939   2 Sheets-Sheet 1
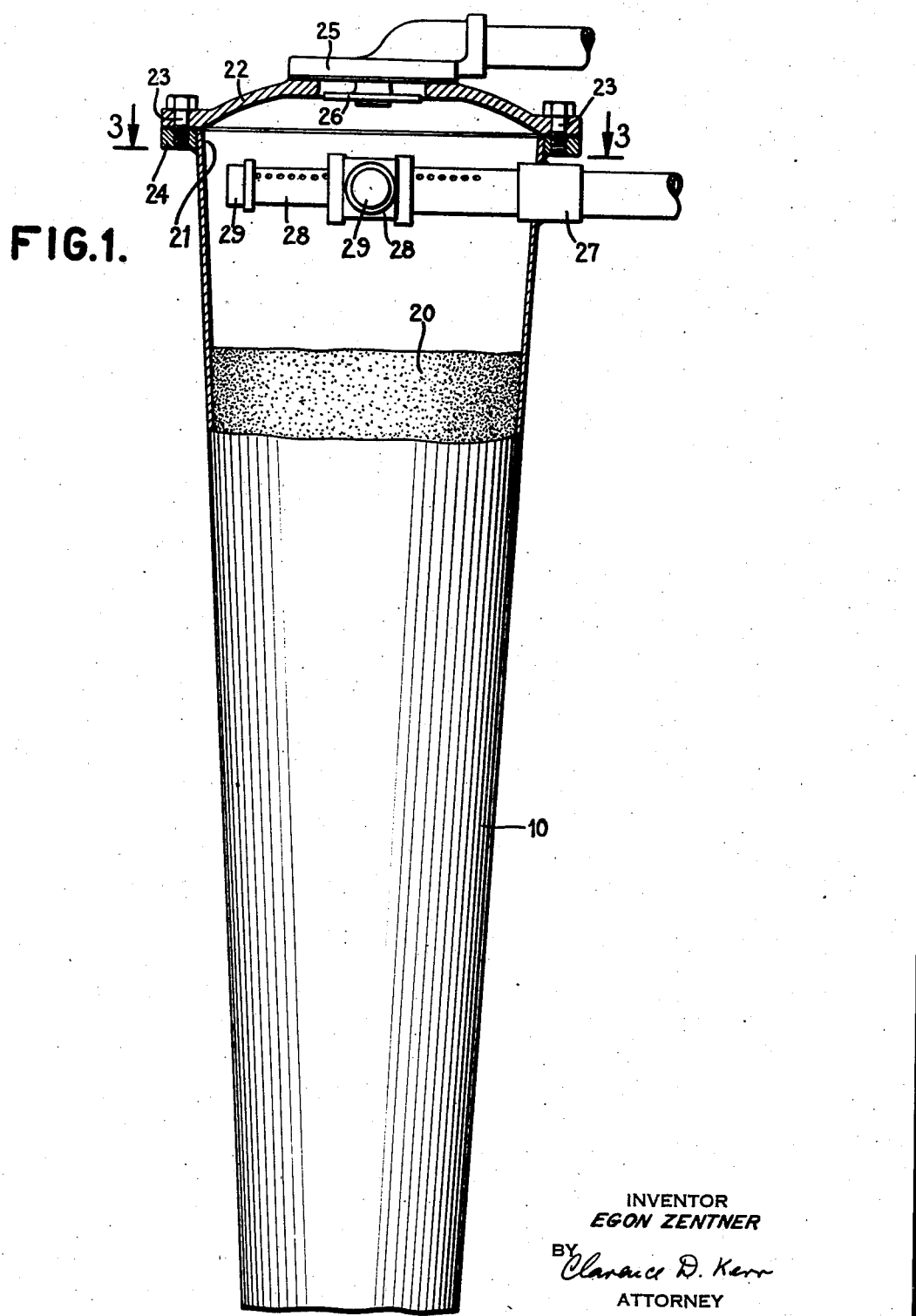

Oct. 21, 1941.  E. ZENTNER  2,259,717
PROCESS OF SOFTENING WATER
Filed July 29, 1939  2 Sheets-Sheet 2
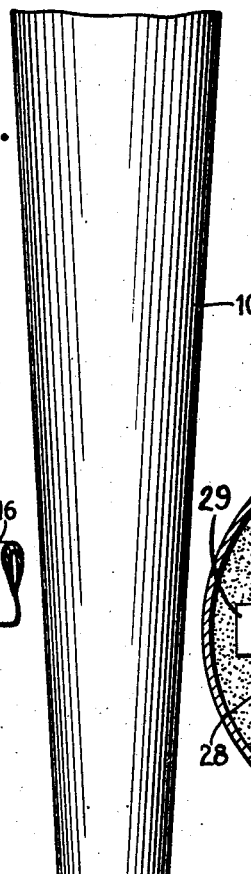
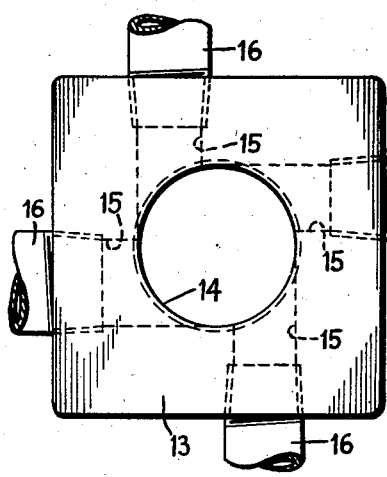
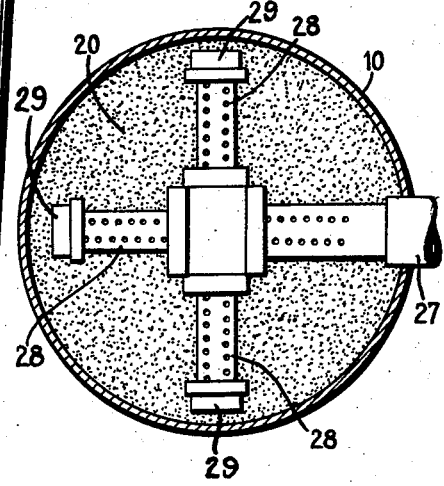
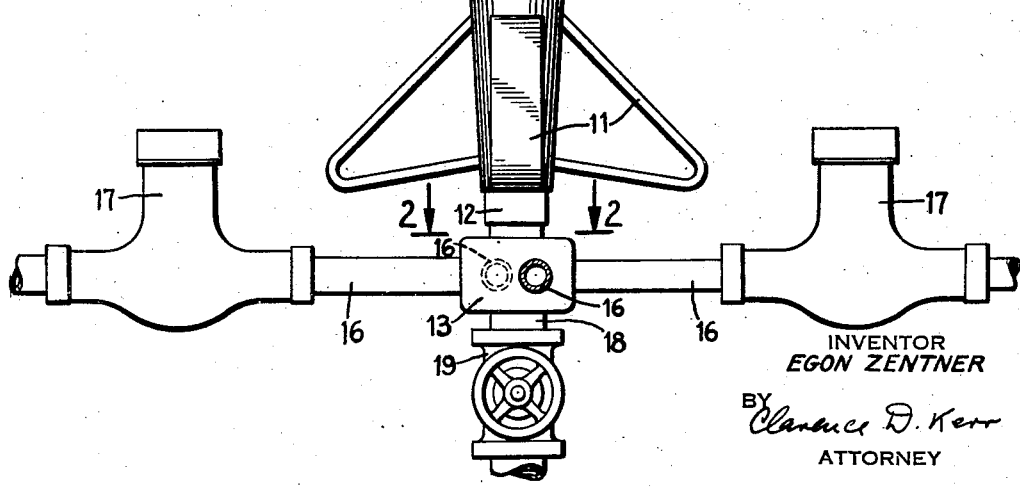
INVENTOR
*EGON ZENTNER*
BY
*Clarence D. Kerr*
ATTORNEY Patented Oct. 21, 1941

2,259,717

UNITED STATES PATENT OFFICE 2,259,717

PROCESS OF SOFTENING WATER

Egon Zentner, New York, N. Y.

Application July 29, 1939, Serial No. 287,286
In Czechoslovakia September 16, 1936

11 Claims. (Cl. 210—16)

This invention relates to a process for softening water by the addition of precipitating agents thereto, and more particularly is directed to a process for treating water to which softening chemicals have been added whereby precipitation of the hardness constituents is quickly and economically obtained.

This application is a continuation-in-part of my copending applications Serial No. 162,767 filed September 7, 1937 and Serial No. 245,311 filed December 12, 1938.

In the so-called lime-soda process for softening hard water, the water is dosed with suitable chemicals, such as lime, and soda ash if it is needed, in amounts depending upon the nature and quantity of the hardness producing constituents present in the water. The addition of these softening chemicals produces a reaction resulting in the precipitation of the hardness constituents from the water.

The rate of precipitation in softening water by this process is relatively slow and various means have been proposed from time to time in an endeavor to accelerate the precipitation and the separation of the precipitated matter from the water. Agitation of the water after chemicals have been added thereto insures a reasonably complete reaction of the added chemicals with the hardness constituents dissolved in the water and is advantageous in effecting the precipitation of the hardness constituents. However, the precipitates settle out as a sludge which necessarily requires large tanks and a fairly long retention time of the water in the settling tank.

The passing of water, to which softening chemicals have been added, through a bed of marble or similar granular material acting as a contact agent has also been proposed by flowing the treated water downwardly through the bed, at a rate sufficiently rapid to provide only a brief contact of the water with the marble. When the treated water is only contacted with the marble particles briefly, the effluent contains the bulk of the precipitate, which must then be settled out or removed by filtration. This requires the use of filtering apparatus of some character, or of one or more large clarifying tanks. In any event, while the marble speeds up the precipitation of the hardness constituents, the precipitation requires at least 15 or 20 minutes to become complete and the precipitated matter is a sludge type of material.

It is an object of my invention to soften water by adding one or more softening chemicals thereto and passing the water immediately through a bed of fine granular contact material in such a manner and at such a velocity as to maintain the particles of the granular contact agent in continuous motion while still allowing the precipitated matter to precipitate on the granules of the contact material.

Another object of my invention is to treat hard water with softening chemicals and pass the treated water upwardly through a bed of a granular contact agent, and regulating the grain size of the granular material, the velocity of the water, and the size and shape of bed of granular material, so that the granules are maintained in continuous motion, are not allowed to cement together, and the precipitated hardness constituents are deposited on the granules.

One suitable form of apparatus for carrying out my invention is shown in the accompanying drawings in which Figs. 1 and 1A taken together show a side elevation of a contact chamber for softening hard water.

Figure 2 is a horizontal sectional view on the line 2—2 of Fig. 1A.

Figure 3 is a horizontal sectional view on the line 3—3 of Fig. 1.

In the drawings, numeral 10 indicates a container which is preferably in the shape of an inverted truncated cone. Suitable legs 11 or other suitable means may be provided for support at the base of the container 10, and a coupling 12 may be connected to the lower end thereof. Block 13 having a central vertical opening 14 may be threaded on the lower end of coupling 12. This block 13 is preferably provided with a plurality of horizontal openings 15 communicating tangentially with the central vertical opening 14. Separate pipes 16, preferably provided with individual metering devices 17, may be threaded into the openings 15 to supply water to be treated and chemicals in appropriate proportions. A pipe 18 provided with a valve 19 may be threaded into the lower portion of the central opening 14.

Container 10 is filled with a granular contact material 20 such as marble sand which may be introduced into the container through the opening 21 at its top. Normally, this opening 21 is closed by a lid 22 held in place by suitable means such as the bolts 23 passing through the flange 24 that is welded to or otherwise secured around the top of container 10. An overflow outlet 25 equipped with a suitable baffle 26 may be provided in the lid 22, if desired.

An outlet for treated water is provided near the top of the container 10 and may consist of the outlet pipe 27 extending through the wall of the container to which are secured the branch pipes 28, each such pipe being perforated on its upper surface and the branch pipes 28 having caps 29 on their outer ends.

In the operation of this apparatus, the container 10 is filled with a suitable finely granular contact material through the opening 21 and the lid 22 is secured in place. Valve 19 is maintained closed and water to be softened is then passed through one or more of the pipes 16 into the opening 14 and thence upwardly through the contact material 20 in the container 10. Suitable softening chemicals may be introduced simultaneously through one or more of the inlet pipes 16 becoming mixed with the water in the opening or mixing chamber 14 and passing with the water upwardly through the contact material 20. The chemicals thus added to the water are preferably in solution. For example, in most cases a lime solution will be introduced through one of the pipes 16, and in certain cases a solution of soda ash may be introduced separately through another pipe 16. Other chemicals such as alum or the like may likewise be introduced separately if needed.

The rates of flow of the water and chemical solutions through the pipes 16 may be adjusted by suitable valves (not shown) in accordance with the metering devices 17 to proportion the chemicals as needed for the particular water to be softened. Just sufficient chemicals should be added to effect the required amount of softening of the water.

The velocity of water and chemicals is so adjusted that the granular contact material will be maintained in continuous motion. The actual velocity of the water will vary with different shapes and sizes of containers and with different grain sizes of the granular material. For example, with larger grain sizes of contact material, a higher velocity of liquid will be required to maintain the contact granules in suspension or in motion. Too high a velocity of water should be avoided, however, since this would tend to carry some of the contact granules out of the container with the effluent.

The softened water flows out of the container 10 through pipe 27 being withdrawn through the perforations in pipes 27 and 28. The water thus obtained may be used directly as soft water or may be passed first through a filter such as a sand filter (not shown) if desired. In case the perforations in pipes 27 and 28 become clogged, the water flows out through the auxiliary outlet 25.

I have found that by carrying out this process of softening water in accordance with my invention an extremely rapid precipitation of the hardness constituents from hard water can be obtained. Usually these constituents are precipitated as calcium carbonate, and the calcium carbonate is precipitated or crystallized onto the granules of the contact material, without cementing these granules together. The precipitation or softening can be completed in only 1 to 3 minutes or even less time to such an extent that the water leaving the bed of granular material is practically free from calcium carbonate suspensions, is softened and does not form objectionable after-precipitates or sludge, thus proving that the precipitation is substantially completed during the contact with the granular contact material.

Relatively small containers for the contact material may be employed as compared with the usual sludge or clarifying tanks, because of the extremely rapid rate of precipitation that is obtained. The contact material may be any suitable granular material as is well known in the art, for example, marble, dolomite, gravel, sand, alkaline earth phosphates, and the like. When such a granular material is employed in a conical container such as shown in the drawing, the grain size of the granules is selected so that the granules are held in suspension by the water flowing through them and the water remains in contact with the suspended granules for a time sufficient to effect complete precipitation of the hardness constituents. For most purposes, calcite or marble sand passing through a 48 to 65 mesh screen and having a size of about 0.1 to 0.3 millimeter in diameter is suitable. With different sizes and shapes of containers, however, smaller or larger sizes may be used.

As the process of softening the water proceeds, the grains of the contact substance become larger and larger by reason of the matter precipitated or crystallized thereon, and when these granules are removed from the contact chamber, it is found that they are hard and do not contain water as is contained in sludge separated out in clarifying tanks. When the granules of the contact agent become too coarse to be satisfactory for further use according to my invention, they are removed and the contact chamber is re-charged with fine granular material. When the container 10 is to be re-charged, the valve 19 may be opened and the used granular material washed out through pipe 18. The valve 19 is then closed and fresh granular contact material is introduced through the opening 21 as previously described.

The removed contact granules may be used for various purposes, such as de-acidifying water or for certain filtering operations. The used granular contact material, particularly if marble or some other form of calcium carbonate is employed for this purpose, may be readily calcined without the difficulties involved in calcining wet sludge, and the calcined product (lime) re-used to treat further quantities of hard water to precipitate carbonate hardness. In this way the cost of chemicals for softening may be substantially reduced. In some instances, the coarse contact material removed from the contact chamber is hard enough so that it can be crushed to a smaller grain size and re-used as contact material.

For purposes of illustration, specific examples of the operation of my invention are given:

*Example I.*—Utilizing a conical contact container such as shown in the drawings having a height of about seven feet and a volume of about 17 gallons, hard water having a total hardness of 302 parts per million expressed in terms of $CaCO_3$ of which 285 parts per million was present as calcium hardness, was introduced into the lower portion of the contact chamber 10 through one of the pipes 16 together with sufficient lime solution to convert all of the bicarbonate alkalinity of the water into carbonate alkalinity, or in other words enough to precipitate all of the calcium hardness. The rate of flow of the water and lime solution was maintained at about 8 gallons per square foot per minute and the chamber 10 was filled with calcite having a grain size of 0.1 to 0.3 mm. The methyl orange alkalinity of the raw water was 290 and its phenolphthalein alkalinity 0.

The effluent resulting from this treatment had a total hardness of 51 parts per million, of which 36 parts per million was calcium hardness, a methyl orange alkalinity of 43 and a phenolphthalein alkalinity of 20.

*Example II.*—Another hard water having a total hardness of 356 parts per million, a calcium hardness of 339 parts per million, a methyl orange alkalinity of 26 and a phenolphthalein alkalinity of 2 was similarly treated being mixed at the inlet of the chamber 10 with sufficient soda ash solution to obtain the desired reduction in calcium hardness and a quantity of lime solution equivalent to the methyl orange alkalinity of the raw water. These chemical solutions were introduced through separate pipes 16 to avoid any premature reaction. The effluent in this case had a total hardness of 73 parts per million, of which 58 parts was calcium hardness, a methyl orange alkalinity of 40 and a phenolphthalein alkalinity of 21.

The tangential introduction of the water and chemicals at the lower portion of the conical contact chamber 10 has proved to be advantageous, although it is not essential since satisfactory results can be obtained by introducing the water in a laterally radial direction or directly in a central upward direction. The essential feature of the operation is to maintain the granular contact material in suspension in the water without carrying it along and out of the container.

At the beginning of the introduction of the water into the contact chamber, I prefer to introduce first a quantity of raw water without chemicals added thereto, or water already softened, to get the contact material in suspension and in motion. The softening chemicals may then be added to the water and the process carried out continuously. After the water softening process has been completed, or when it is desired to change the contact material in the chamber, I prefer to pass either plain raw water or softened water through the chamber in the same or a reverse direction for a short time in order to preclude any possibility of the contact granules becoming cemented together by the action of residual chemicals in the chamber. While these precautions are not essential to the satisfactory operation of my process, they prevent any possibility of the granules becoming agglomerated or cemented together.

The contact chamber itself is preferably a steeply conical chamber, although other shapes of contact chambers may be employed for this purpose. Chambers of inverted conical shape have the advantage of gradually reducing the velocity of the water as it approaches the top of the chamber, thus keeping the granular material more uniformly in suspension. In addition, a sufficient time of contact between the granules and the water is provided for the precipitated matter to become completely deposited on the granules.

If insufficient time for contact between the water and contact granules is allowed, the effluent will be quite turbid and will require settling or filtering. Also, if the chemicals are added to the raw water a substantial time prior to the introduction of the water into the contact material, some precipitation of the hardness constituents may take place before the water comes in contact with the granular contact material. The matter thus precipitated is then carried through the contact bed and emerges with the effluent from the contact chamber. I prefer, therefore, to add the softening chemicals to the raw water immediately prior to entry of the water into the contact chamber. In this way, most or all of the hardness constituents will be crystallized or deposited on the granules of contact material, and the effluent from the chamber will be reasonably free from suspended matter. By the terms "immediately passing" and "immediately thereafter" used in the claims, therefore, I mean to specify that water containing the precipitating chemical is passed through the granular contact material before a substantial part of the added chemical has reacted with the constituents in the water to form a precipitate.

The terms and expressions employed above are used as terms of description and not of limitation, and it is intended, in the use of such terms and expressions, not to exclude any equivalents of the features shown and described or portions thereof, it being recognized that various obvious modifications will occur to a person skilled in the art.

I claim:

1. A process of softening hard water by precipitating hardness constituents on cores of contact material comprising adding to the water a softening chemical and immediately passing the water containing such chemical upwardly through a bed of granular contact material at a velocity sufficient to maintain the contact material in substantially continuous motion.

2. A process of softening hard water by precipitating hardness constituents on cores of contact material comprising adding to the water a softening chemical and immediately passing the water containing such chemical upwardly through a sufficiently large bed of granular contact material to deposit the precipitated hardness constituents of the water thereon, the velocity of said water being sufficiently high and the granules of said contact material being sufficiently small to maintain said granules in substantially continuous motion.

3. A process of softening hard water by precipitating hardness constituents on cores of contact material comprising introducing the water into the lower portion of an elongated chamber containing granular contact material, adding a softening chemical to the water substantially simultaneously with said introduction, and flowing the water containing said chemical upwardly through said contact material at a velocity high enough to agitate and maintain said granular material in suspension but insufficient to carry the contact material out of said chamber.

4. A process as defined in claim 3 in which the water is introduced into the chamber at such an angle thereto as to flow upwardly into the chamber with a swirling motion.

5. A process of softening water containing calcium ions comprising adding to the water chemicals to react with said calcium ions and precipitate calcium carbonate, and immediately after the addition of said chemicals flowing the water upwardly through a bed of granules of calcium carbonate at a rate sufficient to deposit precipitated calcium carbonate on said granules and to keep said granules in continuous motion.

6. A process of softening hard water comprising the steps of passing a stream of water to be treated upwardly through a bed of granular contact material at a rate sufficient to maintain the contact material suspended in the water, and mixing with the stream of water as it enters said bed a stream of a solution of a softening chemical and a coagulant proportioned to effect a precipitation of the hardness constituents in the water to be treated.

7. A process of softening hard water comprising introducing into the lower portion of a chamber containing a finely granular contact material separate streams of hard water and a solution of a chemical for precipitating the hardness in said water, mixing said streams and immediately flowing the mixed streams upwardly through the contact material at such a rate as to maintain said contact material in suspension without carrying it out of said chamber and to precipitate hardness constituents of the water on said contact material.

8. A process of softening hard water comprising introducing into the lower portion of a chamber containing a finely granular contact material separate streams of hard water and a solution of lime, mixing said streams, and immediately flowing the mixed streams upwardly through the contact material at such a rate as to maintain said contact material in suspension without carrying it out of said chamber and to precipitate hardness constituents of the water on said contact material.

9. A process of softening hard water comprising introducing into the lower portion of a chamber containing a finely granular contact material separate streams of hard water and solutions of lime and soda ash, mixing said streams, and immediately flowing the mixed streams upwardly through the contact material at such a rate as to maintain said contact material in suspension without carrying it out of said chamber and to precipitate hardness constituents of the water on said contact material.

10. A process of treating a solution of an electrolyte comprising mixing with said solution a chemical reacting with said electrolyte to form a precipitate, and immediately thereafter flowing the mixture upwardly through the bed of granular insoluble contact material at such a rate as to agitate said contact material continuously and to form said precipitate on said contact material.

11. A process of treating a solution of an electrolyte comprising mixing with said solution a chemical reacting with said electrolyte to form a precipitate, and immediately thereafter flowing the mixture upwardly through a bed of relatively inert granular contact material of sufficient size to collect thereon as cores substantially all of said precipitate, said mixture being flowed at a sufficiently high rate to agitate the contact granules continuously and minimize adhesion of said granules to each other.

EGON ZENTNER.